No. 633,373. Patented Sept. 19, 1899.
F. TONI.
PNEUMATIC TIRE.
(Application filed July 6, 1899.)
(No Model.)
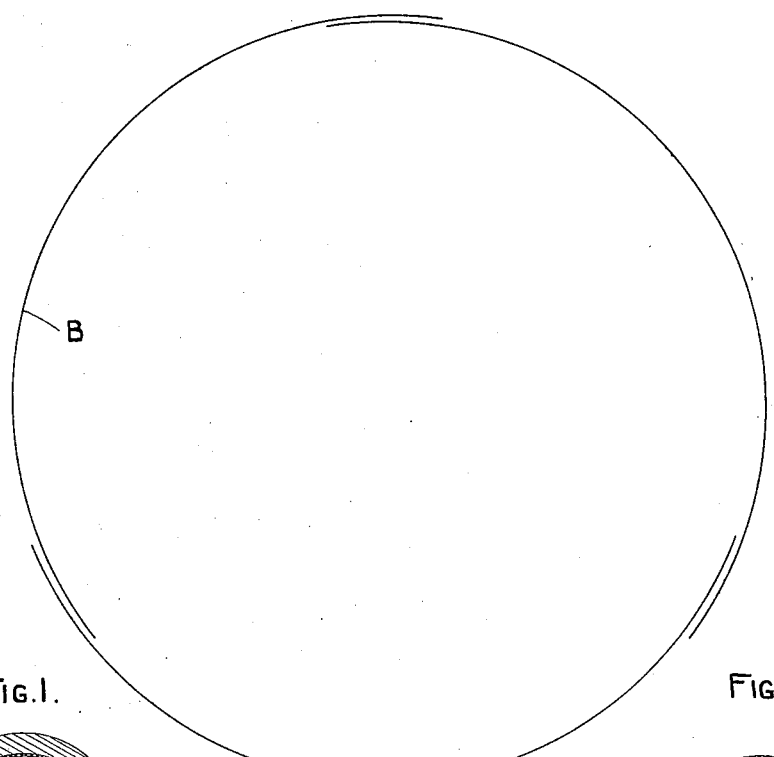
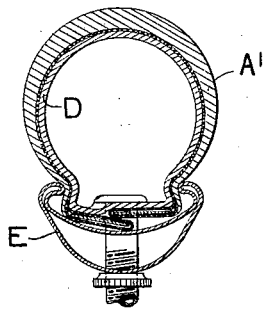
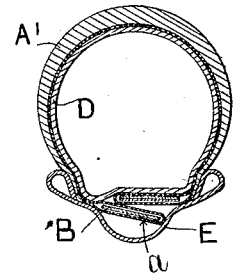
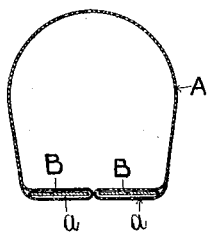
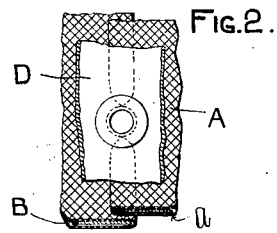
WITNESSES.
H. Knight Broad.
J. Davies.
INVENTOR.
Francisco Toni
per Robert Phillips.
Attorney.

UNITED STATES PATENT OFFICE.

FRANCISCO TONI, OF LONDON, ENGLAND.

PNEUMATIC TIRE.

SPECIFICATION forming part of Letters Patent No. 633,373, dated September 19, 1899.

Application filed July 6, 1899. Serial No. 722,969. (No model.)

*To all whom it may concern:*

Be it known that I, FRANCISCO TONI, a subject of the Queen of Great Britain, residing at Fulham, London, in the county of Middlesex, England, have invented a certain new and useful Improvement in Pneumatic Tires, (for which I have obtained a patent in Great Britain, No. 26,555, bearing date the 15th of December, 1898,) of which the following is a full and complete specification.

My invention relates to an improvement in pneumatic tires of what I may term the "self-fixing" type, the object being to produce a tire which on inflation of the air-tube will seat itself on and become securely attached to the wheel-rim without any mechanical aid and within certain limits irrespective of the size or shape of the groove in the rim.

With these ends in view my invention consists of a pneumatic tire comprising an outer cover and an inner inflatable air-tube, the outer cover having the form of an annular ring and being divided or split circumferentially along its inner side and having at its divided edges pockets adapted to receive flat bands each composed or made up of two or more pieces or lengths.

In the accompanying drawings, which illustrate my invention, Figure 1 is a view in transverse section of my tire mounted on a rim of the "clencher" type, and Fig. 2 is a view in plan thereof. Fig. 3 is a view in transverse section showing my improved tire mounted on a rim of the "Welch-Dunlop" type. Fig. 4 is a view in transverse section of the tire before the application of the rubber tread. Fig. 5 is a diagrammatic view showing the construction of the bands.

In carrying out my invention as herein shown I make the foundation A of the outer cover of the tire of canvas or other suitable fabric made or cut on the cross or bias. At the edges of this foundation are formed pockets *a a*, each adapted to receive a flat band B, which is made up of two or more pieces the lengths of which are approximately the same and such that when in position their ends overlap to the extent of three or four inches. The pieces forming the bands B may be made of ribbon-steel or other suitable metal or material.

Each of the pieces forming the band B is fixed at or about the center of its length by sewing or otherwise to the pocket containing it, so as to prevent it having any circumferential movement as a whole in the said pocket. The pieces forming the band in the one pocket are so arranged with reference to those forming the band in the other pocket that the overlapping ends of one band do not coincide with the overlapping ends of the other band.

As the bands B may when the tire is mounted in some forms of wheel-rim overlap one another, they and the pockets containing them are cut away or recessed to provide a passage for the stem of the inflation-valve, as shown by Fig. 2.

The fabric foundation A is shaped and stretched on a mandrel or former, so that it is caused to assume its normal shape when inflated before the rubber tread A' is fixed to it, whereby it naturally tends to resume its shape after distortion, such as is produced by mounting a tire on a wheel-rim.

It will be understood that each band B is extensible and is only limited by the capacity of the fabric of which the foundation is made for extension.

On inflation of the air-tube D after the tire is mounted in the wheel-rim E the pressure acting on the bands B tends to force and keep the edges of the cover down against the bottom of the groove in the rim at the same time that the contractile action of the fabric foundation of the cover tends to contract its circumferential length. These two forces acting in unison firmly secures the tire in the wheel-rim.

Having fully described my invention, what I claim as new, and desire to secure by Letters Patent, is—

1. In a pneumatic tire, the combination with an expansible tube capable of being inflated with air, of an outer cover comprising a fabric foundation in the form of an annular ring split circumferentially along its inner side and having pockets at its edges and a rubber sheath or tread, and of two extensible bands one in each of the pockets of the foundation of the cover each of the said bands being composed of two or more pieces made fast to the pocket at or about the center of its length and each overlapping the end of the next piece, as and for the purpose set forth.

2. In a pneumatic tire, the combination with an expansible tube capable of being inflated with air, of an outer cover comprising a fabric foundation in the form of an annular ring split circumferentially along its inner side and having pockets at its edges and a rubber sheath or tread, and of two extensible bands located in the pockets at the edges of the foundation of the cover each of the said bands being composed of two or more pieces the ends of which overlap, the overlapping ends of the pieces of one band not coinciding with the overlapping ends of the pieces of the other band, as set forth.

3. In a pneumatic tire, the combination with an expansible tube capable of being inflated with air, of an outer cover comprising a fabric foundation in the form of an annular ring split circumferentially along its inner side and having pockets at its edges and a rubber sheath or tread, and of two extensible bands located in the pockets at the edges of the foundation of the cover and made fast thereto at or about the centers of their lengths each of the said bands being composed of two or more pieces the ends of which overlap, the overlapping ends of the pieces of one band not coinciding with the overlapping ends of the pieces of the other band, as set forth.

4. In a pneumatic tire, the combination with an expansible tube capable of being inflated with air, of an outer cover comprising a fabric foundation in the form of an annular ring split circumferentially along its inner side and having pockets at its edges and a rubber sheath or tread, the said fabric foundation being shaped and stretched on a mandrel or former before the rubber sheath or tread is fixed to it, and of two extensible bands located in the pockets at the edges of the foundation of the cover and made fast thereto at or about the centers of their lengths each of the said bands being composed of two or more pieces the ends of which overlap, the overlapping ends of the pieces of one band not coinciding with the overlapping ends of the pieces of the other band, as set forth.

Dated this 27th day of June, 1899.

FRANCISCO TONI.

Witnesses:
ROBERT D. PHILLIPS,
H. KNIGHT CROAD.